United States Patent [19]

Power

[11] 4,198,953

[45] Apr. 22, 1980

[54] SOLAR ILLUMINATED ENERGY CONSERVING GREENHOUSE

[75] Inventor: Dean V. Power, Sandy, Utah

[73] Assignee: Terra Tek, Inc., Salt Lake City, Utah

[21] Appl. No.: 891,149

[22] Filed: Mar. 28, 1978

[51] Int. Cl.² ............................................. F24J 3/02
[52] U.S. Cl. ..................................... 126/428; 47/17; 350/258; 126/430; 126/439; 126/440
[58] Field of Search .................. 126/270, 271; 353/3; 350/258, 259, 260, 264, 265; 47/1, 17, 26

[56] References Cited

U.S. PATENT DOCUMENTS

| 507,999 | 11/1893 | Davis | 126/270 X |
| 2,777,253 | 1/1957 | Bensin | 126/270 X |
| 3,511,559 | 5/1970 | Foster | 350/258 |
| 4,108,373 | 8/1978 | Chiapale et al. | 237/1 A |

Primary Examiner—Samuel Scott
Assistant Examiner—Lee E. Barrett
Attorney, Agent, or Firm—M. Reid Russell

[57] ABSTRACT

The present invention in an energy conserving greenhouse involves an insulated and opaque structure whose inner walls are preferably formed, coated or colored to reflect visible light striking thereagainst onto plant surfaces therein, the structure utilizing a shuttered lense arrangement of minimum dimensions, that is open during daylight hours to pass sunlight from a focusing solar collector, that sunlight passing through an infra red trap to heat a material therein, that heat being removed for immediate heating of the structure and/or storage for later heating thereof, the remaining sunlight spectra, including the visible spectra passing therefrom and to a diffuser that directs and disperses it throughout the structure interior.

21 Claims, 12 Drawing Figures

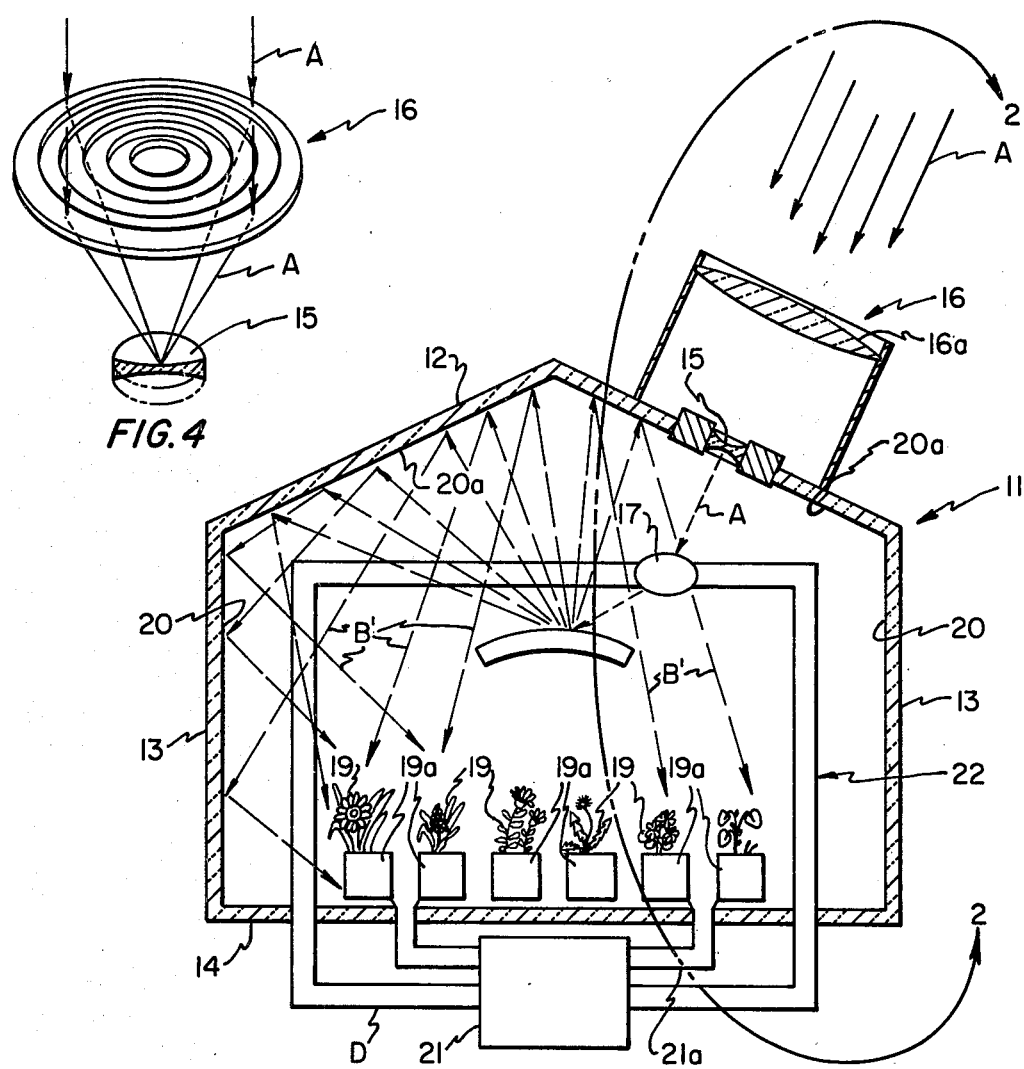
FIG.4
FIG.1
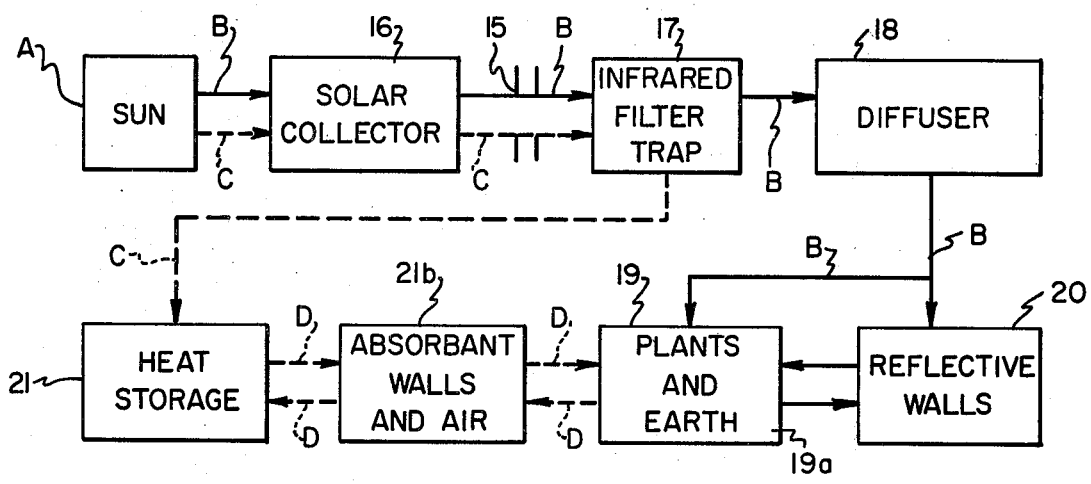
FIG.3

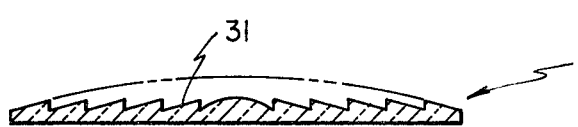
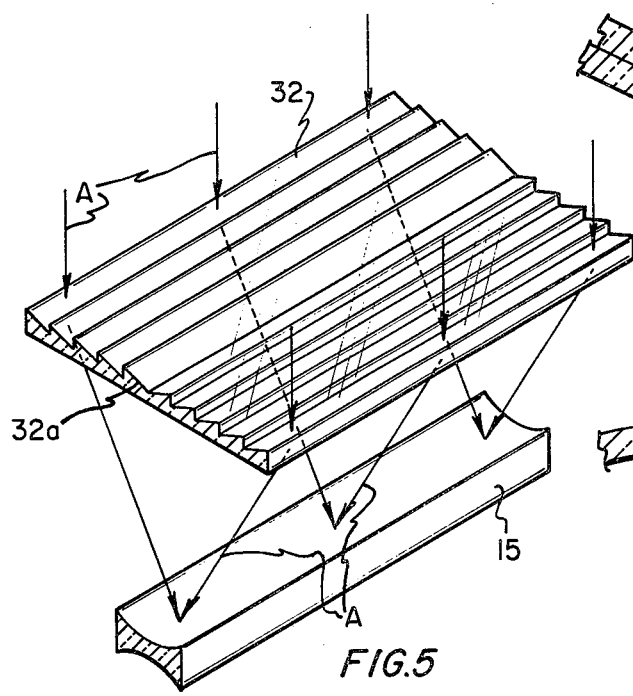
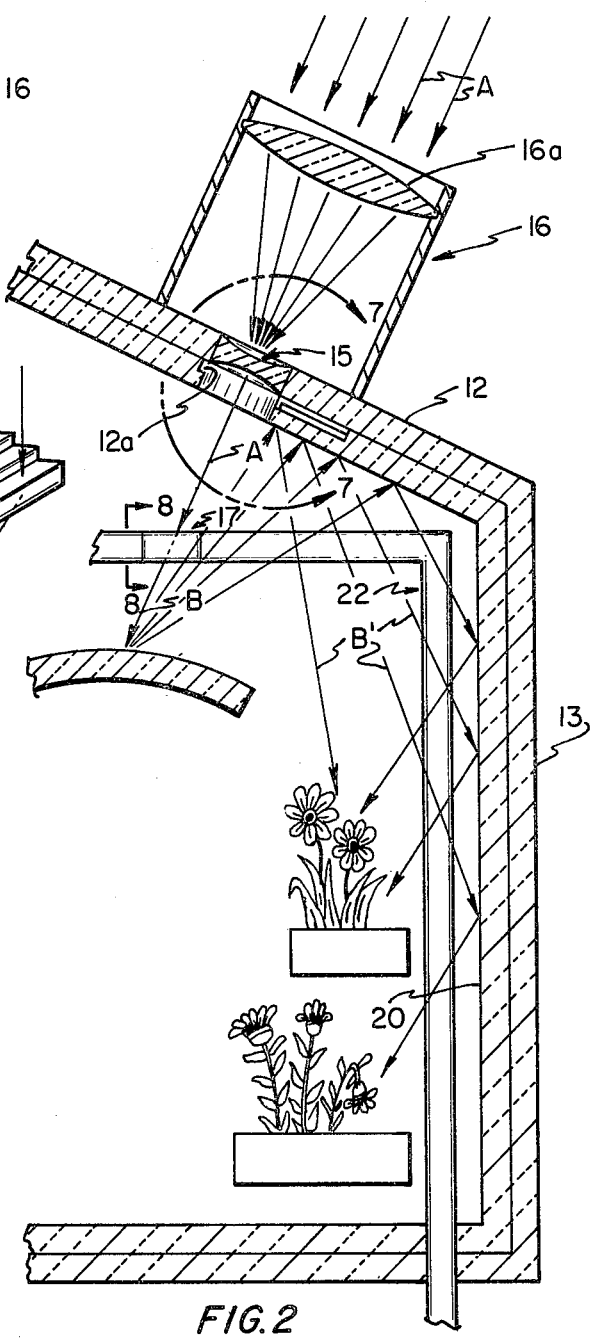
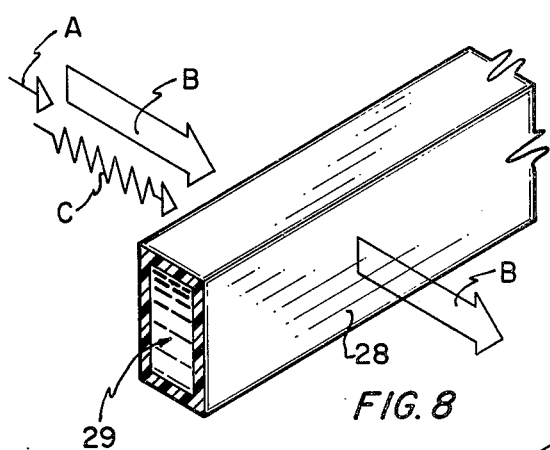
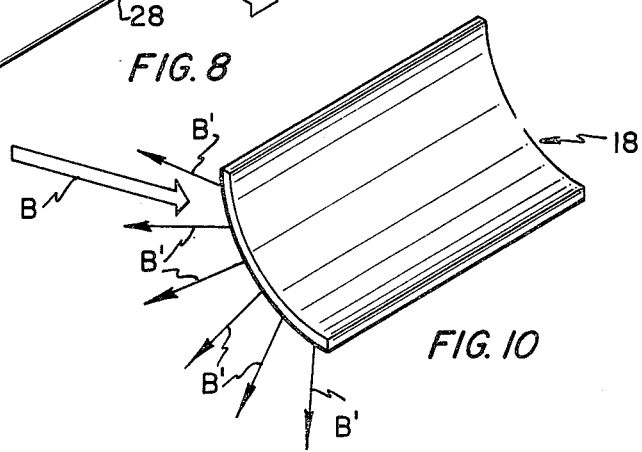

SOLAR ILLUMINATED ENERGY CONSERVING GREENHOUSE

BACKGROUND OF THE INVENTION

1. Field of the Invention

This invention relates to structures, preferably greenhouses, that are arranged to limit energy losses therefrom but will admit sufficient sunlight to promote plant growth and to provide for space heating.

2. Prior Art

Greenhouses arranged to pass sunlight through windows, or the like, that maintain a constant interior temperature to support growing plants therein are not new. An example of one such device is shown in U.S. Pat. No. 2,777,253. In recent times, with energy shortages and a resulting high cost of energy, an emphasis has been directed towards a utilization of solar energy for heat. Such solar utilization, of course, lends itself to the needs of a greenhouse. An example of an arrangement for solar heating of water to heat a structure that is somewhat like the heating arrangement of the present invention is shown in U.S. Pat. No. 4,018,213. The present invention, unlike the above cited prior art patented devices and arrangements, involves a utilization of sunlight both for promoting plant growth and realizes the heat potential of natural sunlight for heating a thermal storage media for use in heating a structure. The present invention provides the above combination along with an insulated structure wherethrough an appropriate opening covered with a transparent material of minimum dimensions to pass sufficient sunlight to support plant growth is provided for passing sunlight therethrough that has been gathered and focused appropriately to promote plant growth therein with minimum compromise to the insulative characteristics of the structure.

Where sunlight is passed through a narrow area only it is obvious that to provide sufficient sunlight to support plant growth therein it is necessary to gather sunlight over a wide area and consolidating it into a narrow area or band for passage into the structure wherein it is diffused such that the visible portion of that light required for photosynthesis of plants is distributed throughout the structure. The present invention therefore also involves both a collector for catching and consolidating sunlight and a diffuser within the structure for spreading the beam of concentrated sunlight from the collector over a wide area therein where plants are located. Certainly, in recent years many different sunlight collector arrangements have been developed though none have been, within the knowledge of the inventor, utilized with a greenhouse. One such collector for heating water is shown in U.S. Pat. No. 4,041,318, which collector, unlike the collector of the present invention does not involve an arrangement for passing sunlight through a narrow roof opening into a structure. Also, devices for diffusing light for illuminating an interior of a structure are not new. One such device is shown in the U.S. Pat. No. 2,768,556, which device was, however, for the purpose of providing work area lighting and was structurally unlike the diffuser taught by the present invention.

The present invention, unlike the discovered prior art or any device within the knowledge of the inventor, involves a unique combination of sunlight receiving and processing devices that are used in conjunction with a well insulated structure whose insulative characteristics are compromised only minimally by an opening that is only that size of opening necessary to pass the required sunlight, which opening is closed by a transparent closure and can be covered to further guarantee the integrity of the structure to minimize heat losses. The present invention in an energy conserving greenhouse therefore is believed by the inventor to be both a novel and unique combination of an insulated structure, with a sunlight collection arrangement exterior to the structure, and interior arrangements for utilizing the heat portion of that sunlight for structure heating with visible spectra thereof being dispersed within the structure for promoting plant growth. The present invention is therefore, within the knowledge of the inventor, believed to be both novel and unique and is a decided improvement over former greenhouse structures.

SUMMARY OF THE INVENTION

It is the principle object of the present invention to provide a greenhouse structure that is constructed and insulated to retain heat therein, that utilizes a natural sunlight as a primary or supplemental heat source for structure heating and utilizes the visible spectra thereof for promoting plant growth.

Another object of the present invention is to provide an energy conserving greenhouse suitable for providing a closely controlled interior climate conducive to healthy plant growth.

Another object of the present invention is to provide an energy conserving greenhouse that consists of a structure that is well insulated and is arranged to admit only that amount of sunlight necessary to support plant growth therein through a minimal area of slot or opening formed in the structure, providing thereby for a minimum compromise of the insulative characteristics of the structure.

Another object of the present invention is to provide an energy conserving greenhouse having elements or parts thereof that provide a capability for collecting sunlight over a large area and consolidating that sunlight into a narrow area or strip for passage through a shuttered lense into the greehouse providing thereby just sufficient sunlight for structure heating and to stimulate plant growth therein.

Still another object of the present invention in an energy conserving greenhouse is to provide apparatus within the greenhouse for removing for immediate structure heating or storage at least a portion of the heat potential of the sunlight passed therein.

Still another object of the present invention is to provide an energy conserving greenhouse capable of admitting consolidated sunlight and diffusing and reflecting that sunlight throughout the greenhouse interior.

Still another object of the present invention in energy conserving greenhouses is to provide a structure that can be manufactured with and from conventional techniques and materials such that the costs of construction are competitive with the construction of a conventional greenhouse that utilizes glass panels or panes as the walls and roof thereof.

Principal features of the present invention in an energy conserving greenhouse include a structure that is insulated against heat loss through the walls the roof thereof. The structure, of course, has at least one entrance arranged therein and the roof or walls have at least one opening arranged therethrough that is covered by at least one section or pane of transparent material. The opening cover may or may not involve a focusing lense configuration and may have a shutter or door arranged therewith to cover said opening when the sun is not shining. Said opening is intended to allow concentrated sunlight to pass therethrough while effecting a minimum compromise of the insulative character of the structure, restricting to a minimum the loss of heat therefrom. Exterior to the structure, and arranged to direct focused sunlight into that opening, preferrably, on the structure roof, is a focusing collector that gathers sunlight striking thereon and focuses it into a beam, ribbon, or band for passage through that opening into the structure. The beam, ribbon or band of sunlight, passed within the structure passes through an infra red filter trap wherethrough a liquid travels that removes the infra red or direct heat portion from that sunlight. The infra red filter trap may be located as part of the opening cover, or may, and preferrably is, located within the structure proximate to that opening. The sunlight visible spectra portion passes through the trap into a rediffuser that spreads the condensed sunlight, reflecting and directing it over a plant growth area within the structure.

The structure interior walls are preferrably covered with a reflective coating, as by painting them white or having a reflective surface fixed thereto, and the earth within the structure wherein plants are growing may be likewise covered with a reflective material. So arranged, light striking thereon will be reflected therefrom, that light eventually striking and being absorbed by a plant surface.

The present invention by providing a structure that is well insulated, and minimizing transparent areas in the structure through which direct sunlight is passed, which areas have a lower insulative efficiency than do the structure walls and ceiling, minimizes the areas of the structure that are most susceptible to heat loss. The structure of the present invention therefore provides for a structure that will efficiently retain heat and, by utilizing sunlight for heating as well as for promoting plant growth, provides for a greenhouse that can be operated for a minimum energy cost.

Further objects and features of the present invention will be elaborated on herein and will become apparent from the following detailed description taken together with the accompanying drawings.

THE DRAWINGS

FIG. 1, is a schematic view of a cross section of an energy conserving greenhouse of the present invention;

FIG. 2, an enlarged detailed view taken within the line 2—2 of FIG. 1, showing a section of the energy conserving greenhouse with arrows A shown representing sunlight striking a focusing collector thereon that consolidates sunlight and passes it therethrough;

FIG. 3, a block schematic showing sunlight components passing through the elements of the energy conserving greenhouse of FIGS. 1 and 2;

FIG. 4, a profile perspective view of a first preferred embodiment of a focusing collector for use as shown in FIGS. 1 and 2, shown as a round lense gathering sunlight and focusing it into the shuttered lense for passage into the energy conserving greenhouse;

FIG. 4(a), a side elevation view of the focusing collector of FIG. 4;

FIG. 5, a profile perspective view of a second embodiment of a focusing collector shown consisting of a rectangular section of sloping lenses sunlight striking thereon shown focused into a narrow band passing into a shuttered lense for passage into the energy conserving greenhouse;

FIG. 6, a third embodiment of a focusing collector shown as consisting of a pair of first concave mirrors arranged to receive, focus and reflect sunlight striking thereon into a second mirror arranged to reflect that sunlight therefrom as a narrow band into the shuttered lense;

FIG. 7, a sectional view taken within the lines 7—7 of FIG. 2, showing a preferred embodiment of a shuttered lense for incorporation with the roof of the energy conserving greenhouse;

FIG. 8, profile sectional view taken within the lines 8—8 of FIG. 2, showing a preferred arrangement of an infra red filter trap collected sunlight shown passing therethrough a liquid traveling therein absorbing the infra red spectra and passing the other sunlight spectra therethrough;

FIG. 9(a), a number of focusing collectors shown arranged to extend across the roof of the energy collecting greenhouse of FIGS. 1 and 2;

FIG. 9(b), a view like that of FIG. 9(a) only showing the roof of the energy conserving greenhouse as having focusing collector arranged longitudinally thereon, which single focusing collector should be taken as being one of a number of such focusing collectors, and;

FIG. 10, a sectional view taken along the line 10—10 of FIG. 2, showing a preferred arrangement of a diffuser that receives the remainder of the sunlight passed from the infra red filter trap breaking up and reflecting that light therefrom.

DETAILED DESCRIPTION

Referring now to the drawings

Figure 6:
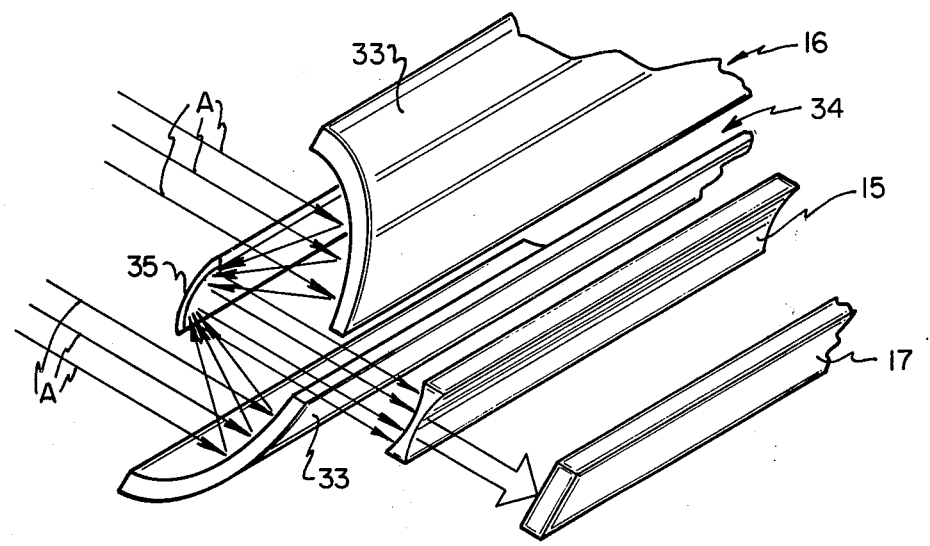

In FIG. 1 is shown a schematic representation of a preferred arrangement of an energy conserving greenhouse 11 of the present invention. The energy conserving greenhouse 11, hereinafter referred to as greenhouse can, of course, be any desired shape but is shown herein as preferrably having a gabled roof 12 that is supported by upstanding walls 13 that rest on a foundation 14 and should be understood to have at least one entrance into the interior thereof. The greenhouse 11 preferrably has at least one sun passing opening formed therethrough that is herein identified as a shuttered lense 15. Shuttered lense 15 is shown arranged through roof 12 to pass sunlight directed thereon from a focusing collector 16. The focusing collector 16 is arranged, preferrably, on the roof 12 to focus and pass sunlight, shown as arrows A, into the shuttered lense 15, that sunlight, as a beam, passes into greenhouse 11 and into an infra red filter trap 17, hereinafter referred to as I.R. trap 17. Through the I.R. trap 17 a liquid is passed that absorbs the sunlight infra red spectra, heating that liquid, passing therethrough the sunlight visible spectra, also known as the sunlight photosynthetic portion. The I.R. filter trap 17 is preferrably arranged within the greenhouse 11 and should, for obtaining good heat conduction, be located as close to focusing lense 15 as possible and could even be arranged as part of the focusing lense 15, but if so arranged, would tend to pass heat therefrom into the atmosphere above the structure and so it is preferred to arrange it within the structure.

Shown in FIGS. 1 and 2, a diffuser reflector 18 is included within greenhouse 11 to break up and reflect that visible spectra passed from the I.R. filter trap 17 onto living plants 19 and earth 19(a) therein. To further reflect visible spectra light passing from the diffuser 18 and visible spectra light reflected off from the leaves of plants 19, the greenhouse 11 interior walls 20 and ceiling 20(a) are preferably arranged to reflect light, by painting the surfaces white, covered with a mirror surface, or the like, to provide for a maximum utilization of the photosynthetic fractions in the plant growth process. To further provide a maximum utilization of the sunlight photosynthetic fractions the greenhouse soil 19(a) can be covered with a reflective material. So arranged the only light absorbing surfaces within the greenhouse 11 would be plants themselves, achieving thereby a maximum utilization of the growth fractions of sunlight visible spectra, and providing a minimization of the amount of sunlight needed to be passed into the greenhouse 11 for plant growth. So arranged the sunlight gathering surface area of the focusing collector 16 and the open area of the shuttered lense 15 can be held to only that required to collect and pass just that minimum sunlight, holding energy losses through that open area to the minimum. The above light reflecting arrangement of providing reflective surfaces to everything but the growing plants in the greenhouse 11 reduces to a minimum the ratio of sunlight required as compared to the plant growth area. So arranged, the ratio is less than one foot of growth area per each foot of sunlight gathering surface of the focusing collector to adequately support growth of plants 19.

The block schematic of FIG. 3 shows the sunlight processing flow into and within the greenhouse 11. Shown therein the entering sunlight is identified as arrow A and is shown as consisting of infra red spectra portions, broken arrow C, and a visible spectra portion or photosynthetic fractions, including ultra violet, shown as solid arrow B. Shown therein the sunlight spectra is separated at the infra red filter trap 17, that infra red spectra being utilized for heating a liquid that provides, as shown by broken lines C going to a heat storage unit 21 and by broken lines D therefrom, heating the absorbant walls and air, block 21(b), for immediate heating of the greenhouse 11 interior. A uniform temperature is thereby achieved for plants 19 and earth 19(a), the heat storage unit 21 also retaining heat therein for later greenhouse 11 heating, that heat passing into the greenhouse through duct 21(a), shown in FIG. 1. The remaining sunlight spectra, specifically the visible and ultra violet portions passes, from the I.R. filter trap 17, shown as arrow B, against diffuser 18 whereat it is broken up and reflected against plant 19 surfaces, earth 19(a), reflective walls 20 and ceiling 20(a), that light eventually striking and being absorbed by a plant 19 surface, promoting plant growth and providing some heating of the greenhouse 11 interior.

FIG. 2 shows a cross section of a portion of the greenhouse 11 showing preferred apparatus for passing sunlight therein. It should, however, be obvious that, while only one such arrangement is shown a number of such arrangements could be so included as part of greenhouse 11, which additional arrangements would still fall within the scope of this disclosure. Shown in FIG. 2, sunlight, arrows A, passes into a sunlight receiving area, shown herein as a lense 16(a) of focusing collector 16. Focusing collector 16 should, of course, be understood to also include a tracking arrangement, not shown, align continuously the lense 16(a) such that captured sunlight will be directed into and through shuttered lense 15 no matter the sun's attitude. As already mentioned herein, sunlight passes from the shuttered lense 15, shown also as arrow A, through the infra red filter trap 17 and thence against diffuser 18. At the filter trap the infra red portion of the sunlight is absorbed by an infra red absorbing media, preferably a liquid flowing therein, heating that liquid, the remainder of the sunlight passed therethrough, identified as arrow B, consists of the visible spectra or sunlight photosynthetic fractions and ultra violet. This sunlight remainder is then deflected and separated by diffuser reflector 18, shown by arrows $B^1$, onto and against growing plants 19 and earth 19(a) that are shown arranged as a single tier in FIG. 1 and as two tiers in FIG. 2 and against wall and ceiling inner surfaces 20 and 20(a). As shown in FIG. 2 the greenhouse walls 13 and the roof 12 are preferably well insulated to minimize the heat loss therethrough, and, of course, the shuttered lense 15 preferably involves only a narrow or small area, that should be understood to be only that area necessary to pass an amount of sunlight A therethrough that is just that light needed for utilization by plants 19 and earth 19(a) in the growth process.

Figure 7:
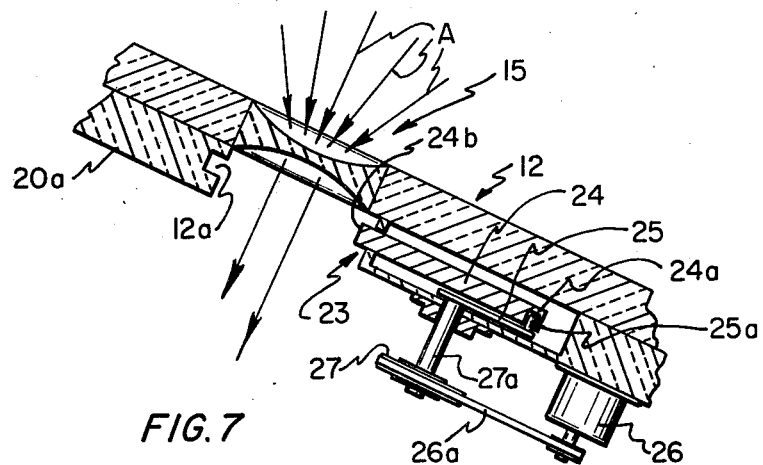

To further minimize heat loss, as shown in FIG. 2, through the shuttered lense 15, a shutter cap 23, shown best in FIG. 7, is preferably included to close off and seal the shuttered lense 15 during hours where sunlight is not available. Shutter cap 23, preferably consists of a plate 24 which can be manual or lever operated but is preferably operated by a driver can 25 having a dog 25(a) on one end that is journaled into a hole 24(a) in plate 24. So arranged, by operating motor 26 that turns, through a belt 26(a), a pulley 27 that rotates a shaft 27(a) to turn can 25 so as to move plate 24 across the shuttered lense. So arranged, the end 24(b) of plate 24 will pass into an appropriate notch 12(a) formed in roof 12. Obviously, the shutter cap 23, to avoid damage or potential fire, if it were inadvertantly left across said shuttered lense when sunlight is passing therethrough, should include a failsafe arrangement, not shown, to release said shutter plate 24 so that it will pass back into its recessed attitude shown in FIG. 7. Also, to further preclude fire or damage, the shutter plate 24 should have a reflective surface on the surface opposite to the focusing collector 16 and should also be formed from a material that will not be damaged by high temperatures.

Sunlight passed from and through shuttered lense 15, as already discussed herein, travels through the I.R. filter trap 17. I.R. filter trap 17, as shown best in FIG. 8, preferably consists of a transparent or translucent fluid carrying pipe 28, shown preferably herein as a rectangular pipe, that receives the consolidated beam of sunlight, arrow A, containing both of infra red spectra, arrow C, and visible spectra or photosynthetic fractions and ultra violet, arrow B. As stated, the infra red spectra thereof, arrow C, is absorbed by fluid 29 traveling in pipe 28, the visible spectra or photosynthetic fractions, and ultra violet, arrow B, passing therethrough, for diffusion within the greenhouse 11 providing heating and lighting therein. The heated fluid 29 is circulated as part of a greenhouse heating system 22, shown best in FIG. 1, that consists of the I.R. filter trap 17, a heat storage section 21 and ducts 21(a). Heat from fluid 29, not immediately used in greenhouse heating, is transferred for storage, as into rocks, or the like, not shown. The heating system 22, as needed, may also involve fans, pumps or the like, not shown, to transfer heat from that storage section 21 during the period when the sun is not shining into the air and walls of the greenhouse 11, to maintain a constant temperature therein. In practice, a solution of copper chloride, or an organic salt saturated solution, or the like, has been found to have sufficient infra red spectra heat absorption capabilities to absorb that heat portion of the sunlight spectra.

The visible spectra or photosynthetic fractions of sunlight, arrow B, as already stated herein, pass from the I.R. filter trap 17 against diffuser 18, shown in FIG. 2 and best in FIG. 10. Diffuser 18, preferably is arranged to scatter or disperse outwardly the visible spectra striking thereon but, it should be understood, could be arranged to pass light therethrough, spreading that light in such passage, not shown. So arranged, the sunlight spectra, arrow B, is scattered or broken into multiple beams, shown as arrows $B^1$ in FIG. 2. To provide for required light dispersion a faceted reflective surface is preferably included with the diffuser 18 and in addition to the convex surface shown in FIGS. 2 and 10, it can also involve flat or concave surfaces, not shown, to direct a portion of the visible spectra striking thereon against another surface, such as a reflective wall or ceiling whereat it is broken up. The respective convex, concave, or flat surfaces of diffuser 18, shown at 30 in FIG. 10, can be covered with such things as dimpled aluminum, frosted glass, flat white paint, or be a glass beaded screen, or the like, for breaking up, and reflecting light striking thereon. Preferably, however, any portion of the diffuser 18 that is intended to redirect light received thereon should be a light reflective surface.

Figure 9A:
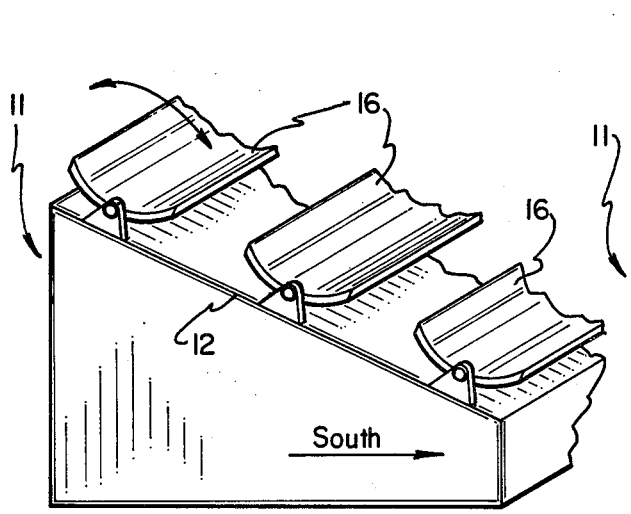
Figure 9B:
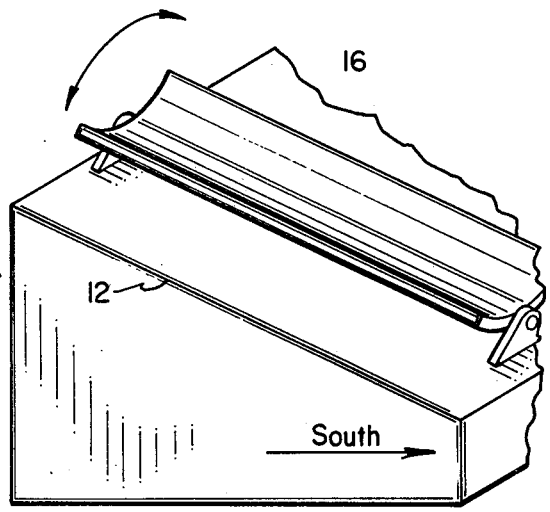

Referring to FIGS. 9(a) and 9(b), the focusing collector 16 could be arranged either laterally or longitudinally on the surface of roof 12. In either of configuration of FIG. 9(a) or 9(b) the present invention should be understood to include an alignment arrangement, not shown, for tracking the sun as it moves from east to west daily and/or north to south seasonally.

Optimumlly, it would be ideal if sufficient energy could be removed from sunlight striking the focusing collectors 16 to both promote the photosynthesis of plants within greenhouse 11, and to satisfy the greenhouse heating needs. However, as those heating needs are dependent upon outside temperature as well as the amount of sunlight available and the amount actually collected, it is preferrable to include with greenhouse 11 a backup heating arrangement, not shown. Certainly, in determining heating needs it is necessary to consider: the heat retention qualities of the insulated walls, roof and flooring of greenhouse 11; the amount of heat generated in the plant growth process; the heat available in the sunlight after its passage through the I.R. filter trap 17; and the heat generated by auxiliary equipment such as fans, pumps, and the like therein.

Whether the greenhouse 11 of the present invention provides for either a partial or total energy independence, it is certainly an improvement in energy conservation over former conventional greenhouses. Therefore, as the cost of construction of such a former greenhouse as compared to the cost of construction of the greenhouse 11 of the present invention would be essentially the same, the greenhouse 11 of the present invention provides a significant energy saving improvement over former greenhouses.

Obviously, in calculating sunlight needed in greenhouse 11 it is necessary to take into consideration the cost of focusing collectors 16 and the size of the shuttered lense 15 and the predicted heat losses therethrough, balanced against the greenhouse heat and light needs. As has been outlined herein, the amount of available photosynthetic fraction of incident sunlight for plant growth can be increased by appropriately including reflecting surfaces within the greenhouse itself and even covering the earth wherein the plants grow with a reflective surface. As a further consideration in determining the visible spectra needs within the greenhouse 11 it has been found that the light intensity necessary to promote plant growth is somewhat dependent upon the presence of atmospheric $CO_2$ as well as the interior temperature of the structure. While the maintenance of optimum $CO_2$ level has been difficult in conventional greenhouses due to ventilation requirements, as the greenhouse 11 can be closed and is well insulated, the $CO_2$ level can therefore be maintained within very close limits. Further, where it has heretofore been found in practice that somewhat less than a foot of collector area is needed for each foot of plant growth area, by closely controlling conditions within the greenhouse and providing for a full utilization of light passed therein for plant growth, as is possible with the present invention, it is possible for the greenhouse 11 to require as little as one quarter plant growth area. The greenhouse 11 of the present invention would preferably not be designed at such minimum sunlight admission level but would preferably be arranged to approximately match one square foot or less of collector area for each foot of greenhouse plant growth area. Further, as the weather is unpredictable and certainly changeable, it may be necessary in anticipation of a cloudy day to provide for artificial illumination within the greenhouse to augment natural sunlight, which inclusion of artificial illumination would also come within the scope of the present disclosure.

Assuming therefore that the focusing collectors 16 have sufficient area to provide the required light within greenhouse 11, it is of course desirable that they be arranged to focus that sunlight into as small an area or narrow band as possible for projection through shuttered lense 15, the size of which area or band, or course, determining the size of the shuttered lense. Certain focusing collectors have been shown appropriate for use with the greenhouse of the present invention. In FIG. 4 is shown an example of a square fresnel lense arrangement of a focusing collector, viewed from above that is shown to resemble a target, with, in FIG. 4(a) that fresnel lense shown in profile view as consisting of a number of circular incline planes 31 which planes are each themselves prismatic lenses. In this arrangement sunlight striking on each plane is bent, as shown in FIG. 4, to meet at a common area, at which area shuttered lense 15 is preferably arranged. In this configuration the shuttered lense 15 could be circular or square in shape. A number of such focusing collectors may have to be installed with roof 12 to provide for the required amount of sunlight, though only one such focusing collector is shown herein for purposes of this disclosure.

Distinct from the point or small area focusing, shown with the focusing collector of FIGS. 4 and 4(a), in FIG. 5 is shown a rectangular panel configuration of a focusing collector 16, that includes a number of incline plane lenses 32 that are shown arranged alongside one another. Each incline plane lense 32 should be taken as being a prismatic lense, the lenses facing oppositely on different sides of a common longitudinal center 32(a), the incline faces of the two adjacent lenses meeting at the longitudinal center 32(a). So arranged, sunlight striking thereon will be focused into a band that passes into a narrow rectangular shuttered lense 15.

Another embodiment of a focusing collector 16 is shown in FIG. 6. Therein, focusing lense 16 is shown as consisting of two concave mirrors 33 that are arranged as opposite sides of a parabola with a slot or narrow opening 34 therebetween. A collimating mirror 35, is arranged with its reflective face opposite to opening 34 such that sunlight, arrow A, striking on the reflective faces of the concave mirrors 33 will be reflected therefrom against the collimating mirror 35 that, in turn, reflects that sunlight, arrow A, through opening 34 and thence through shuttered lense 15 into I.R. filter trap 17.

In all of the above embodiments of shuttered lense 16 sunlight is focused into a small area or narrow band for passage through a minimal opening of shuttered lense 15. A wide area of sunlight can thereby be consolidated into a smaller area or narrow band necessitating thereby that only a minimum opening be formed through an insulated greenhouse roof for passing just sufficient sunlight therethrough needed to promote plant growth within that greenhouse. The present invention, therefore, provides for a collection of that amount of sunlight necessary or needed for plant growth for transmittal into a greenhouse such as to require only a minimal opening formed therethrough so as to compromise to a minimum the insulative characteristics of the structure, minimizing thereby heat losses through the structure.

Although a preferred embodiment of my invention in an energy conserving greenhouse and the individual components thereof have been herein disclosed, it should be understood that the present disclosure is made by way of example and that variations are possible without departing from the subject matter coming within the scope of the following claims, which claims I regard as my invention.

I claim:

1. A solar illuminated energy conserving greenhouse comprising,
    a structure adapted for use as a greenhouse having upstanding walls and a roof thereover and having at least one portal formed therethrough, said walls and roof being insulated appropriately so as to minimize heat losses from said structure, said structure having also at least one opening formed therethrough for passing focused sunlight into said structure, said opening being covered appropriately with a transparent arrangement;
    a lens means for gathering and focusing sunlight and directing said collected sunlight through said opening into said structure;
    a sunlight filtering means for receiving the collected sunlight and for removing for use in heating said structure the infra red spectra portions of that sunlight while passing the remaining spectra portions of said sunlight therethrough, and;
    diffuser means arranged to receive said remaining spectra portions of said sunlight from said sunlight filter means spreading and distributing it within said structure.

2. An energy conserving greenhouse as recited in claim 1 wherein the opening for passing sunlight therethrough has multiple transparent panes arranged thereover.

3. An energy conserving greenhouse as recited in claim 1, wherein, the opening is closed over by a focusing lense arrangement.

4. An energy conserving greenhouse as recited in claim 1, further including,
    a shutter means arranged for movement across said opening to close off and insulate said opening when sunlight is not directed thereon.

5. An energy conserving greenhouse as recited in claim 1 wherein the lens means consists of, a type of fresnel lense.

6. An energy conserving greenhouse as recited in claim 1 wherein, the sunlight filter means consists of,
    an infra red filter arranged to pass a sunlight infra red spectra absorbing media therethrough, through which media the focused sunlight is passed to remove the infra red spectra therefrom, passing the remaining sunlight spectra therethrough.

7. An energy conserving greenhouse as recited in claim 6, wherein,
    the infra red filter means is a transparent pipe arranged to pass the infra red spectra absorbing media therethrough.

8. An energy conserving greenhouse as recited in claim 6, wherein the infra red absorbing media is a copper chloride solution.

9. An energy conserving greenhouse as recited in claim 1, wherein the diffuser means consists of,
    a convex surface; and
    diffuser surface means covering said convex surface for breaking into a number of beams and reflecting therefrom light striking thereon.

10. An energy conserving greenhouse as recited in claim 1, further including,
    reflective surfaces arranged on the interior walls and ceiling of the structure.

11. An energy conserving greenhouse as recited in claim 10, further including,
    a reflective surface arranged over the structure floor and over earth areas within said structure wherein plants grow.

12. A solar illuminated energy conserving greenhouse comprising,
    a structure adapted for use as a greenhouse having upstanding walls and a roof thereover and having at least one portal formed therethrough, said walls and roof being insulated appropriately so as to minimize heat losses from said structure, said structure having also at least one opening formed therethrough for passing focused sunlight into said structure, said opening being covered appropriately with a transparent arrangement;
    a solar collector means consisting of at least one reflective surface arranged to focus sunlight received thereon, and a collimating reflector arranged to receive, from said reflective surface, said focused sunlight to direct appropriately said focused sunlight therefrom;
    a sunlight filtering means for receiving the collected sunlight and for removing for use in heating said structure the infra red spectra portions of that sunlight while passing the remaining spectra portions of said sunlight therethrough, and;
    diffuser means arranged to receive said remaining spectra portions of said sunlight from said sunlight filter means spreading and distributing it within said structure.

13. An energy conserving greenhouse as recited in claim 12 wherein
    the opening for passing sunlight therethrough has multiple transparent panes arranged thereover.

14. An energy conserving greenhouse as recited in claim 12, wherein, the opening is closed over by a focusing lens arrangement.

15. An energy conserving greenhouse as recited in claim 12, further including, a shutter means arranged for movement across said opening to close off and insulate said opening when sunlight is not directed thereon.

16. An energy conserving greenhouse as recited in claim 12, wherein, the sunlight filter means consists of, an infra red filter arranged to pass a sunlight infra red spectra absorbing media therethrough, through which media the focused sunlight is passed to remove the infra red spectra therefrom, passing the remaining sunlight spectra therethrough.

17. An energy conserving greenhouse as recited in claim 16, wherein, the infra red filter means is a transparent pipe arranged to pass the infra red spectra absorbing media therethrough.

18. An energy conserving greenhouse as recited in claim 16, wherein, the infra red absorbing media is a copper chloride solution.

19. An energy conserving greenhouse as recited in claim 12, wherein the diffuser means consists of, a convex surface; and diffuser surface means covering said convex surface for breaking into a number of beams and reflecting therefrom light striking thereon.

20. An energy conserving greenhouse as recited in claim 12, further including, reflective surfaces arranged on the interior walls and ceiling of the structure.

21. An energy conserving greenhouse as recited in claim 20, further including, a reflective surface arranged over the structure floor and over earth areas within said structure wherein plants grow.

* * * * *